US012696071B2

(12) United States Patent
Mao et al.

(10) Patent No.: US 12,696,071 B2
(45) Date of Patent: Jul. 28, 2026

(54) SERVICE PROCESSING METHOD, USER DEVICE, AND COMPUTER-READABLE STORAGE MEDIUM

(71) Applicant: VIVO MOBILE COMMUNICATION CO., LTD., Chang'an Dongguan (CN)

(72) Inventors: Yuanze Mao, Chang'an Dongguan (CN); Jinzhao Lin, Chang'an Dongguan (CN); Yanbing Wang, Chang'an Dongguan (CN); Ping Cai, Chang'an Dongguan (CN); Yu Jiang, Chang'an Dongguan (CN)

(73) Assignee: VIVO MOBILE COMMUNICATION CO., LTD., Chang'an (CN)

( * ) Notice: Subject to any disclaimer, the term of this patent is extended or adjusted under 35 U.S.C. 154(b) by 411 days.

(21) Appl. No.: 17/964,104

(22) Filed: Oct. 12, 2022

(65) Prior Publication Data

US 2023/0031044 A1 Feb. 2, 2023

Related U.S. Application Data

(63) Continuation of application No. PCT/CN2021/086156, filed on Apr. 9, 2021.

(30) Foreign Application Priority Data

Apr. 15, 2020 (CN) .......................... 202010295262.0

(51) Int. Cl.
 *H04W 60/06* (2009.01)
 *H04W 8/18* (2009.01)
 *H04W 60/04* (2009.01)
(52) U.S. Cl.
 CPC ........... *H04W 8/183* (2013.01); *H04W 60/04* (2013.01); *H04W 60/06* (2013.01)

(58) Field of Classification Search
 None
 See application file for complete search history.

(56) References Cited

U.S. PATENT DOCUMENTS 9,167,592 B1* 10/2015 Hsu ........................ H04L 47/28
10,834,726 B2* 11/2020 Gao ....................... H04L 67/60
(Continued)

FOREIGN PATENT DOCUMENTS

CN 105848227 A 8/2016
CN 108347724 A 7/2018
(Continued)

OTHER PUBLICATIONS

European Patent Office, "Extended European Search Report" From Application No. 21789576.2, Dated Sep. 8, 2023, p. 6.
(Continued)

*Primary Examiner* — Khaled M Kassim
*Assistant Examiner* — Shima Wasel
(74) *Attorney, Agent, or Firm* — Fredrikson & Byron, P.A.

(57) ABSTRACT

The present disclosure provides a service processing method, a user device and a computer-readable storage medium. The user device includes a first subscriber identity module and a second subscriber identity module. The first subscriber identity module is associated with a first subscriber identity, and the second subscriber identity module is associated with a second subscriber identity. The method includes: accessing a mobile network based on the first subscriber identity; and performing a wireless local area network voice VoWiFi service of the second subscriber identity based on a network port corresponding to the mobile network.

6 Claims, 3 Drawing Sheets

(56)  References Cited

U.S. PATENT DOCUMENTS

| | | | | |
|---|---|---|---|---|
| 11,006,476 | B2* | 5/2021 | Zhao ................... | H04L 65/1073 |
| 11,039,297 | B1* | 6/2021 | Desai ..................... | H04L 65/65 |
| 12,028,932 | B2* | 7/2024 | Wang ................... | H04W 8/183 |
| 12,096,519 | B2* | 9/2024 | Hong ................... | H04W 8/186 |
| 2008/0014956 | A1* | 1/2008 | Balasubramanian ... | H04L 43/16 |
| | | | | 455/452.1 |
| 2014/0364118 | A1* | 12/2014 | Belghoul ........... | H04L 65/1104 |
| | | | | 455/435.1 |
| 2017/0105193 | A1* | 4/2017 | Liu ........................ | H04W 68/02 |
| 2017/0318511 | A1 | 11/2017 | Niranjan et al. | |
| 2018/0110081 | A1* | 4/2018 | Serna ................. | H04W 12/068 |
| 2018/0115978 | A1* | 4/2018 | Shi ........................ | H04W 72/56 |
| 2018/0132098 | A1* | 5/2018 | He ........................ | H04W 8/183 |
| 2018/0213392 | A1* | 7/2018 | Ni .......................... | H04W 68/02 |
| 2018/0255567 | A1* | 9/2018 | Keshav ................ | H04W 76/14 |
| 2019/0037465 | A1* | 1/2019 | Srivastava ........ | H04W 36/0022 |
| 2019/0098487 | A1 | 3/2019 | Boettger | |
| 2019/0230132 | A1 | 7/2019 | Brown et al. | |
| 2019/0306898 | A1* | 10/2019 | Goddeti ............... | H04W 76/12 |
| 2020/0037281 | A1 | 1/2020 | Lee et al. | |
| 2020/0187080 | A1 | 6/2020 | He | |
| 2021/0068019 | A1* | 3/2021 | Cuevas Ramirez .. | H04W 36/12 |
| 2021/0136645 | A1* | 5/2021 | Zhao ..................... | H04W 36/30 |
| 2021/0185745 | A1* | 6/2021 | Chinnakkannu ...... | H04W 76/14 |

FOREIGN PATENT DOCUMENTS

| | | | | |
|---|---|---|---|---|
| CN | 108617019 | A | 10/2018 | |
| CN | 108965306 | A | 12/2018 | |
| CN | 110099421 | A | 8/2019 | |
| CN | 110446277 | A | 11/2019 | |
| CN | 110557795 | A | 12/2019 | |
| CN | 110602763 | A | 12/2019 | |
| CN | 110876173 | A * | 3/2020 | ........... H04W 48/16 |
| CN | 111479309 | A | 7/2020 | |
| IN | 110730445 | A | 1/2020 | |
| WO | 2019029618 | A1 | 2/2019 | |

OTHER PUBLICATIONS

International Patent Application No. PCT/CN2021/086156, International Search Report and Written Opinion with Partial English Machine Translation mailed Jul. 7, 2021, 9 pages.

* cited by examiner

SERVICE PROCESSING METHOD, USER DEVICE, AND COMPUTER-READABLE STORAGE MEDIUM

CROSS-REFERENCE TO RELATED APPLICATIONS

This application is a continuation of International Application No. PCT/CN2021/086156, filed on Apr. 9, 2021, which claims priority to Chinese Patent Application No. 202010295262.0 filed in China on Apr. 15, 2020, which are incorporated herein by reference in their entireties.

TECHNICAL FIELD

The present disclosure relates to the field of communications technologies, and in particular, to a service processing method, a user device, and a computer-readable storage medium.

BACKGROUND

With development of a wireless local area network (WLAN) and a voice over Internet Protocol (VoIP) service, a voice over Wi-Fi (VoWiFi) technology has emerged. The VoWiFi technology performs wireless VoIP voice calls by using existing wireless fidelity (Wi-Fi) networks. A user device can perform roaming voice calls, video calls, and other services at any time within the coverage of a WLAN network by using the VoWiFi technology. The VoWiFi technology has attracted more and more attention due to its low communication costs and convenience provided by the WLAN.

In the related art, the VoWiFi technology uses the Wi-Fi as an access network and finally accesses an IP multimedia subsystem (IMS).

However, the VoWiFi uses the Wi-Fi as an access network. When the user device is not in the Wi-Fi network environment, the user device cannot perform a VoWiFi service.

SUMMARY

According to a first aspect of the present disclosure, a service processing method, applied to a user device, is provided. The user device includes a first subscriber identity module and a second subscriber identity module. The first subscriber identity module is associated with a first subscriber identity, and the second subscriber identity module is associated with a second subscriber identity. The method includes:

accessing a mobile network based on the first subscriber identity; and performing a wireless local area network voice VoWiFi service of the second subscriber identity based on a network port corresponding to the mobile network.

According to a second aspect of the present disclosure, a user device is provided. The user device includes a first subscriber identity module and a second subscriber identity module. The first subscriber identity module is associated with a first subscriber identity, and the second subscriber identity module is associated with a second subscriber identity. The user device includes:

an access module, configured to access a mobile network based on the first subscriber identity; and a processing module, configured to perform a wireless local area network voice VoWiFi service of the second subscriber identity based on a network port corresponding to the mobile network.

According to a third aspect of the present disclosure, a user device is provided, which includes a memory, a processor, and a program stored in the memory and capable of running on the processor. When the program is executed by the processor, steps of the service processing method according to the first aspect are implemented.

According to a fourth aspect of the present disclosure, a computer-readable storage medium is provided. The computer-readable storage medium stores a computer program. When the computer program is executed by a processor, steps of the service processing method according to the first aspect are implemented.

According to a fifth aspect of the present disclosure, a computer software product is provided. The computer software product is stored in a non-volatile storage medium. The software product is configured to be executed by at least one processor to implement the steps of the service processing method according to the first aspect.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may obtain other accompanying drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

In this embodiment of the present disclosure, a user device includes but is not limited to a mobile phone, a tablet computer, a laptop computer, a palmtop computer, an in-vehicle terminal, a wearable device, a pedometer, and the like.

Figure 1:
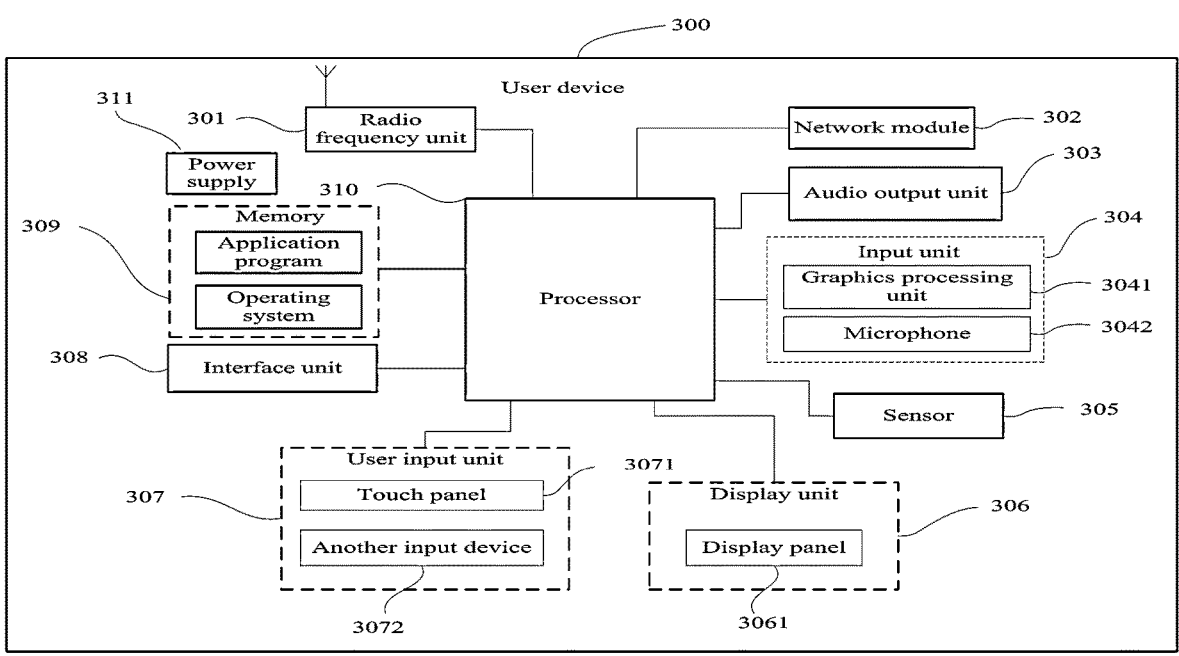
FIG. 1 is a flowchart of a service processing method according to an embodiment of the present disclosure.

Refer to FIG. 1. FIG. 1 is a flowchart of a service processing method according to an embodiment of the present disclosure. The method is applied to a user device, where the user device includes a first subscriber identity module and a second subscriber identity module, the first subscriber identity module is associated with a first subscriber identity, the second subscriber identity module is associated with a second subscriber identity. As shown in FIG. 1, the method includes the following steps.

Step 101: Access a mobile network based on the first subscriber identity.

In a case that the user device is not connected to Wi-Fi, for example, that no Wi-Fi is available, the mobile network may be accessed based on the first subscriber identity. Using an example in which the user device is a mobile phone, the first subscriber identity and the second subscriber identity may respectively be a subscriber identity module (SIM) card 1 and a SIM card 2 of the mobile phone. A data network switch of the mobile phone may be turned on, so that the mobile phone accesses the mobile network.

Step 102: Perform a wireless local area network voice VoWiFi service of the second subscriber identity based on a network port corresponding to the mobile network.

VoWiFi registration of the second subscriber identity may be performed based on the network port corresponding to the mobile network. Alternatively, VoWiFi service authentication of the second subscriber identity may further be performed based on the network port corresponding to the mobile network. Alternatively, a VoWiFi call of the second subscriber identity may further be performed based on the network port corresponding to the mobile network. For example, a VoWiFi service authentication and the registration message of the second subscriber identity may be sent or received by using the network port corresponding to the mobile network, so that signaling interworking of the VoWiFi service with a network-side device can be completed.

It should be noted that the performing a wireless local area network voice VoWiFi service of the second subscriber identity based on a network port corresponding to the mobile network may include, in a case that the user device is not connected to the wireless local area network, sending a VoWiFi registration message of the second subscriber identity to the network-side device based on the network port corresponding to the mobile network; in a case that a mobile network signal parameter of the second subscriber identity is smaller than a first preset value, sending the VoWiFi registration message of the second subscriber identity to the network-side device based on the network port corresponding to the mobile network; or may further include, in a case that the user device is not connected to the wireless local area network, the mobile network signal parameter of the second subscriber identity is smaller than a first preset value, and the mobile network signal parameter of the first subscriber identity is greater than a second preset value, sending the VoWiFi registration message of the second subscriber identity to the network-side device based on the network port corresponding to the mobile network. This is not limited in the embodiments of the present disclosure.

In addition, the performing a wireless local area network voice VoWiFi service of the second subscriber identity based on a network port corresponding to the mobile network may be, in a case that the first subscriber identity performs a call service, performing the wireless local area network voice VoWiFi service of the second subscriber identity based on the network port corresponding to the mobile network; for example, may be, in a case that a voice over long-term evolution VoLTE call is performed based on the first subscriber identity, and if a trigger signal of a dual card and dual active service of the user device is received, performing a VoWiFi call based on the network port corresponding to the mobile network and the second subscriber identity; or may further be, when the first subscriber identity does not perform a call service, the wireless local area network voice VoWiFi service of the second subscriber identity may be performed based on the network port corresponding to the mobile network. This is not limited in the embodiments of the present disclosure.

In a practical application, by using a VoWiFi technology, an operator can use Wi-Fi hotspots to provide a voice service for a user. By using a VoWiFi technology, a user can use a Wi-Fi access to make or answer voice calls or video calls while using the mobile Internet. In the prior art, using VoWiFi needs to be connected to an available Wi-Fi, but the user cannot use VoWiFi outdoors or in other places without a Wi-Fi. In this embodiment of the present disclosure, the mobile network is accessed based on the first subscriber identity, and the VoWiFi service of the second subscriber identity is performed based on the network port corresponding to the mobile network. In a case that no Wi-Fi is available, the second subscriber identity supporting the user device can perform the VoWiFi service by using a mobile network data flow of the first subscriber identity. In addition, VoWiFi service data can be sent and received by using a mobile network port, and the VoWiFi service data is unnecessarily limited to be sent or received by using a Wi-Fi port.

It should be noted that the user device can use an IP address allocated by the mobile network as a source address of the user device, forward a VoWiFi authentication and registration message to the network port corresponding to the mobile network in the user device, and send the VoWiFi authentication and registration message to the network-side device by using the network port corresponding to the mobile network and the mobile network. After receiving the VoWiFi authentication and registration message sent by the user device, the network-side device may send an authentication response message and a registration response message to the user device by using the network port corresponding to the mobile network and the mobile network. A VoWiFi service processing module of the user device can process the authentication response message and the registration response message sent by the network-side device, and complete the VoWiFi registration of the second subscriber identity. After the second subscriber identity is registered on the VoWiFi, when the VoWiFi call service is performed, a data packet of the VoWiFi call service can be sent to the network-side device by using the network port corresponding to the mobile network and the mobile network.

In a practical application, when the user device performs a critical service, such as a game service or a video service, by using the first subscriber identity, the wireless local area network voice VoWiFi service of the second subscriber identity is performed based on the network port corresponding to the mobile network, avoiding that the second subscriber identity occupies an antenna of the user device, and reducing an influence of the second subscriber identity on the critical service performed by the first subscriber to a certain extent.

In this embodiment of the present disclosure, the mobile network is accessed based on the first subscriber identity. The wireless local area network voice VoWiFi service of the second subscriber identity is performed based on the network port corresponding to the mobile network. In this way, when the user device is not in the Wi-Fi network environment, the VoWiFi service may be performed by using a mobile network accessed by another subscriber identity.

Optionally, the performing a wireless local area network voice VoWiFi service of the second subscriber identity based on a network port corresponding to the mobile network includes:

in a case that a preset condition is met, sending a VoWiFi registration message of the second subscriber identity to the network-side device based on the network port corresponding to the mobile network.

The preset condition includes at least one of the following:

that the user device skips connecting to a wireless local area network;

that a mobile network signal parameter of the second subscriber identity is smaller than a first preset value; or that a mobile network signal parameter of the first subscriber identity is greater than a second preset value.

The mobile network signal parameter may include at least one of reference signal receiving quality (Reference Signal Receiving Quality, RSRQ), reference signal received power (Reference Signal Received Power, RSRP), signal to noise ratio (Signal to Noise Ratio, SNR), or the like.

If the mobile network signal parameter of the second subscriber identity is smaller than the first preset value, it can be considered that a network signal of the second subscriber identity accessing the network is relatively weak.

If the mobile network signal parameter of the first subscriber identity is greater than the second preset value, it can be considered that the network signal of the first subscriber identity accessing the network is relatively strong. It can be understood that when the mobile network signal of the first subscriber identity is relatively strong, the VoWiFi service is performed by using the mobile network accessed by the first subscriber identity. In this way, it can be avoided that the call service of the first subscriber identity is affected, when the mobile network signal of the first subscriber identity is relatively weak, and the VoWiFi service of the second subscriber identity is performed by using the mobile network accessed by the first subscriber identity, thereby improving call service quality of the user device.

That the user device is not connected to a wireless local area network may be that the user device is not in a wireless local area network environment, or that a wireless local area network connection module of the user device is abnormal.

The network-side device may include an IMS server.

Using an example in which the user device is a mobile phone, a SIM card 1 of the mobile phone may be a main card, and a SIM card 2 may be a sub card, data network connection of the main card, and signal quality and strength of a connected data network can be detected. For example, a RSRQ parameter, a RSRP parameter, and a SNR parameter of the connected data network can be detected. In a case that the signal quality and strength of the connected data network are greater than the second preset value, the VoWiFi registration message of the second subscriber identity may be sent to the network-side device based on the network port corresponding to the mobile network. In this case, the user device may not be connected to the wireless local area network or may have been connected to the wireless local area network. However, for various reasons (for example, the signal quality of the wireless local area network is not strong enough), it is desirable to send the VoWiFi registration message of the second subscriber identity to the network-side device based on the network port corresponding to the mobile network. This is not limited in this embodiment of the present disclosure.

It should be noted that the case that a preset condition is met may be that the user device can detect and determine whether the preset condition is met, or that the user device may report the mobile network signal parameters to the network-side device, and the network-side device may determine whether the user device meets the preset condition.

The service processing method disclosed in this embodiment of the present disclosure, in a case that the preset condition is met, can perform the VoWiFi service by using the mobile network accessed by another subscriber identity, improving user experience. Optionally, the method further includes: in a case that the mobile network signal parameter of the second subscriber identity is greater than a third preset value, and/or the mobile network signal parameter of the first subscriber identity is smaller than a fourth preset value, performing VoWiFi deregistration of the second subscriber identity based on the network port corresponding to the mobile network.

The third preset value may be greater than the first preset value, and the fourth preset value may be smaller than the second preset value. Further, in a case that the first subscriber identity accesses the mobile network abnormally, the VoWiFi deregistration of the second subscriber identity is performed based on the network port corresponding to the mobile network. The second subscriber identity may send deregistration signaling to the network-side device based on the network port corresponding to the mobile network, and complete the VoWiFi deregistration by using signaling interworking with the network-side device.

In this implementation, in a case that the mobile network signal parameter of the second subscriber identity is greater than a third preset value, and/or the mobile network signal parameter of the first subscriber identity is smaller than a fourth preset value, VoWiFi deregistration of the second subscriber identity is performed based on the network port corresponding to the mobile network. In this way, in a case that the mobile network signal of the second subscriber identity is relatively strong, and/or the mobile network signal of the first subscriber identity is relatively week, the mobile network accessed by the first subscriber identity is no longer used for the VoWiFi service of the second subscriber identity. This can improve call service capacity of the user device.

Optionally, the performing a wireless local area network voice VoWiFi service of the second subscriber identity based on a network port corresponding to the mobile network includes:

in a case that a voice over long-term evolution VoLTE call is performed based on the first subscriber identity, if a trigger signal of a dual card and dual active service for the user device is received, performing the VoWiFi call based on the network port corresponding to the mobile network and the second subscriber identity.

That a trigger signal of a dual card and dual active service for the user device is received may be that when a call is made based on the first subscriber identity, an operation of a user dialing a call by using the second subscriber identity is received; or may be that when the call is made based on the first subscriber identity, an operation of a user answering a call a call through the second user identity card is received. In the prior art, the user device is usually a dual card and single active device, which performs a voce over Long-Term Evolution (Voice over LTE, VoLTE) call based on the first subscriber identity, and performs a VoWiFi call of the second subscriber identity based on the network port corresponding to the mobile network, thereby implementing a dual card and dual active function of the user device.

In this implementation, in a case that a voice over long-term evolution VoLTE call is performed based on the first subscriber identity, if a trigger signal of a dual card and dual active service for the user device is received, the VoWiFi call based on the network port corresponding to the mobile network and the second subscriber identity is performed. In this way, a dual card and dual active function of the user device can be implemented.

Figure 2:
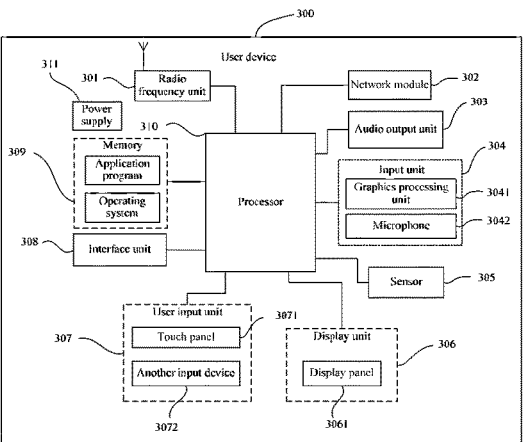
FIG. 2 is a first schematic structural diagram of a user device according to an embodiment of the present disclosure.
Figure 3:
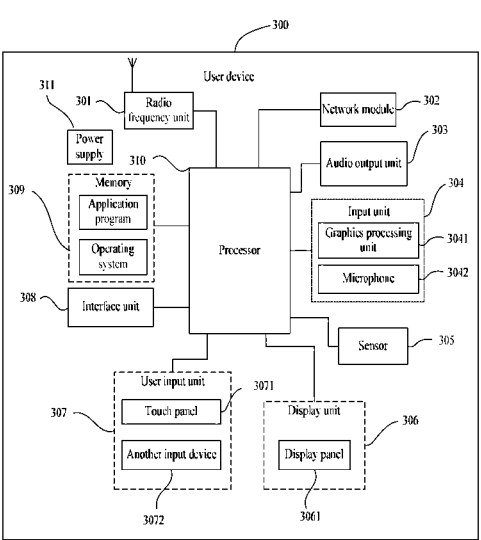
FIG. 3 is a second schematic structural diagram of a user device according to an embodiment of the present disclosure.

Refer to FIG. 2. FIG. 2 is a first schematic structural diagram of a user device. The user device includes a first subscriber identity module and a second subscriber identity module (not shown in the figures). The first subscriber identity module is associated with a first subscriber identity, the second subscriber identity module is associated with a second subscriber identity. As shown in FIG. 2, the user device 200 includes:

an access module 201, configured to access a mobile network based on the first subscriber identity; and
a processing module 202, configured to perform a wireless local area network voice VoWiFi service of the second subscriber identity based on a network port corresponding to the mobile network.
Optionally, the processing module 202 is configured to:
in a case that a preset condition is met, send a VoWiFi registration message of the second subscriber identity to a network-side device based on the network port corresponding to the mobile network.
The preset condition includes at least one of the following:
that the user device skips connecting to a wireless local area network;
that a mobile network signal parameter of the second subscriber identity is smaller than a first preset value; or
that a mobile network signal parameter of the first subscriber identity is greater than a second preset value.
Optionally, as shown in FIG. 3, the user device 200 further includes:
a registering module 203, configured to, in a case that a mobile network signal parameter of the second subscriber identity is greater than a third preset value, and/or a mobile network signal parameter of the first subscriber identity is smaller than a fourth preset value, perform VoWiFi deregistration of the second subscriber identity based on the network port corresponding to the mobile network.
Optionally, the processing module 202 is configured to:
in a case that a voice over long-term evolution VoLTE call is performed based on the first subscriber identity, if a trigger signal of a dual card and dual active service for the user device is received, perform the VoWiFi call based on the network port corresponding to the mobile network and the second subscriber identity.
The user device can implement various processes that are implemented by the user device in the method embodiment of FIG. 1. To avoid repetition, details are not described herein again.

Figure 4:
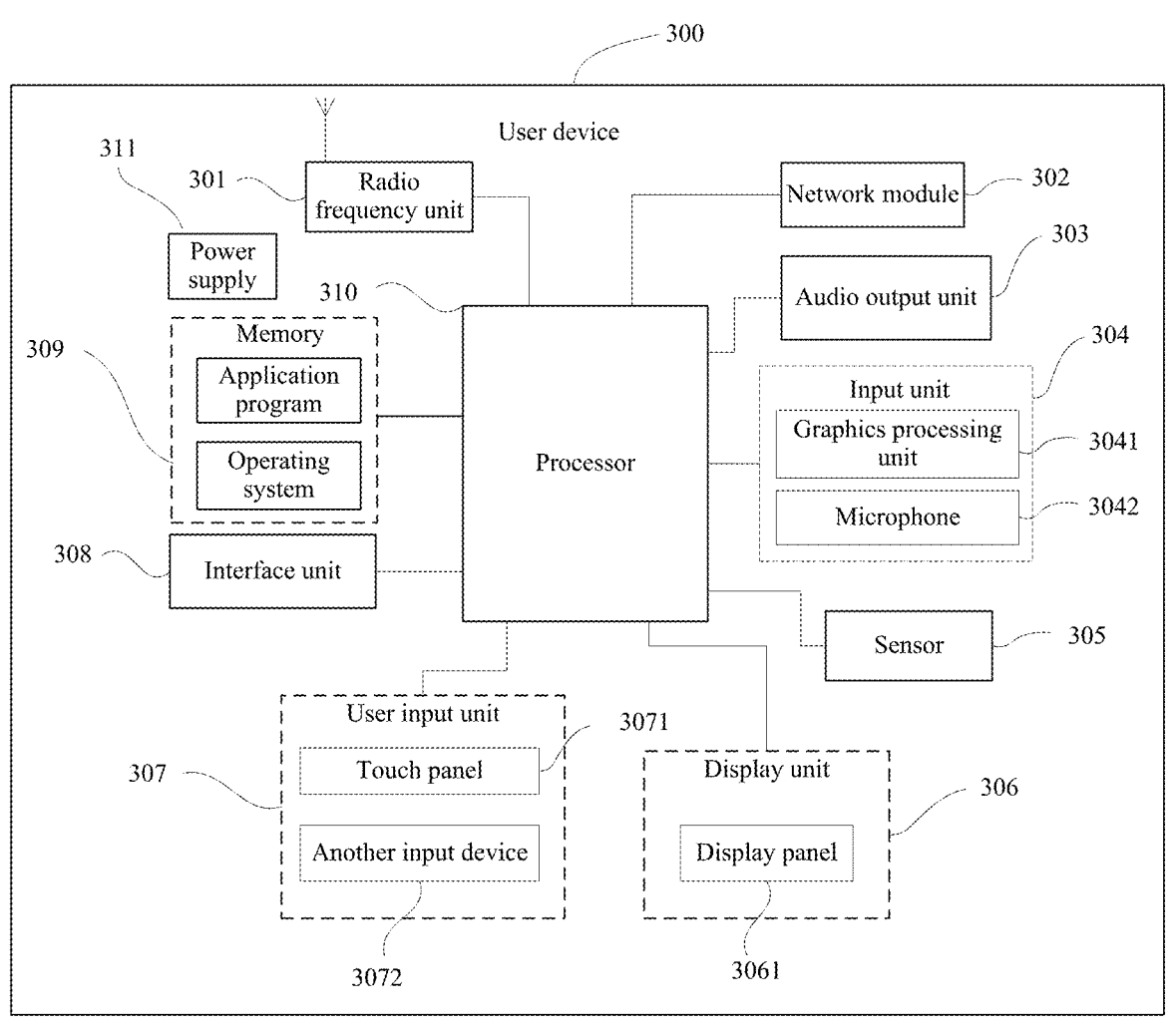
FIG. 4 is a third schematic structural diagram of a user device according to an embodiment of the present disclosure.

FIG. 4 is a schematic diagram of a hardware structure of a user device for implementing various embodiments of the present disclosure.

The user device 300 includes, but is not limited to, components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art may understand that a structure of the user device shown in FIG. 4 does not constitute a limitation on the user device, and the user device may include more or fewer components than those shown in the figure, or combine some components, or have different component arrangements. In this embodiment of the present disclosure, the user device includes but is not limited to a mobile phone, a tablet computer, a laptop computer, a palmtop computer, an in-vehicle electronic device, a robot, a wearable device, a pedometer, and the like.

The user device includes a first subscriber identity module and a second subscriber identity module (not shown in the figures). The first subscriber identity module is associated with a first subscriber identity, and the second subscriber identity module is associated with a second subscriber identity.

The processor 310 may be configured to:
access a mobile network based on the first subscriber identity.
The processor 310 is further configured to:
perform a wireless local area network voice VoWiFi service of the second subscriber identity based on a network port corresponding to the mobile network.
Optionally, the radio frequency unit 301 is configured to:
in a case that a preset condition is met, send a VoWiFi registration message of the second subscriber identity to a network-side device based on the network port corresponding to the mobile network.
The preset condition includes at least one of the following:
that the user device skips connecting to a wireless local area network;
that a mobile network signal parameter of the second subscriber identity is smaller than a first preset value; or
that a mobile network signal parameter of the first subscriber identity is greater than a second preset value.
Optionally, the processor 310 is further configured to:
in a case that the mobile network signal parameter of the second subscriber identity is greater than a third preset value, and/or the mobile network signal parameter of the first subscriber identity is smaller than a fourth preset value, performing VoWiFi deregistration of the second subscriber identity based on the network port corresponding to the mobile network.
Optionally, the processor 310 is further configured to:
in a case that a voice over long-term evolution VoLTE call is performed based on the first subscriber identity, if a trigger signal of a dual SIM and dual active service for the user device is received, perform the VoWiFi call based on the network port corresponding to the mobile network and the second subscriber identity.
It should be understood that in this embodiment of the present disclosure, the radio frequency unit 301 may be configured to receive and transmit information, or receive and transmit signals during a call. Alternatively, the radio frequency unit 301 transmits downlink data to the processor 310 for processing after receiving the downlink data from a base station. In addition, the radio frequency unit 301 transmits uplink data to the base station. Usually, the radio frequency unit 301 includes but is not limited to an antenna, at least one amplifier, a transceiver, a coupler, a low noise amplifier, a duplexer, and the like. In addition, the radio frequency unit 301 may communicate with a network and another device through a wireless communication system.

The user device provides, through the network module 302, users with wireless broadband Internet access, for example, helping users receive and send e-mails, browse web pages and access stream-media, etc.

The audio output unit 303 may convert audio data received by the radio frequency unit 301 or the network module 302 or stored in the memory 309 into an audio signal and output the audio signal as a sound. In addition, the audio output unit 303 may further provide an audio output (for example, a call signal received voice, or a message received voice) related to a specific function implemented by the user device 300. The audio output unit 303 includes a speaker, a buzzer, a telephone receiver, and the like.

The input unit 304 is configured to receive an audio signal or a video signal. The input unit 304 may include a graphics processing unit (Graphics Processing Unit, GPU) 3041 and a microphone 3042. The graphics processing unit 3041 is used to process image data of a static picture or a video obtained by an image capturing device (for example, a camera) in a video capturing mode or an image capturing mode. A processed image frame may be displayed on the display unit 306. The image frame processed by the graphics processing unit 3041 may be stored in the memory 309 (or another storage medium) or sent by using the radio frequency unit 301 or the network module 302. The microphone 3042 may receive a sound and can process such sound into audio data. Processed audio data may be converted, in a call mode, into a format that can be sent to a mobile communication base station by using the radio frequency unit 301 for output.

The user device 300 can further include at least one type of sensor 305, for example a light sensor, a motor sensor and another sensor. Alternatively, the light sensor includes an ambient light sensor and a proximity sensor. The ambient light sensor may adjust luminance of the display panel 3061 based on brightness of ambient light. The proximity sensor may turn off the display panel 3061 and/or backlight when the user device 300 moves to an ear. As a type of motion sensor, an accelerometer sensor may detect accelerations in various directions (usually, three axes), may detect, in a still state, a magnitude and a direction of gravity, and may be configured to recognize a user device posture (for example, screen switching between a landscape mode and a portrait mode, related games, and magnetometer posture calibration), implement a vibration recognition related function (for example, a pedometer or a knock), and the like. The sensor 305 may further include a fingerprint sensor, a pressure sensor, an iris sensor, a molecular sensor, a gyroscope, a barometer, a hygrometer, a thermometer, an infrared sensor, or the like. Details are not described herein.

The display unit 306 is configured to display information entered by a user or information provided for a user. The display unit 306 may include the display panel 3061, and the display panel 3061 may be configured in a form of a liquid crystal display (LCD), an organic light-emitting diode (OLED), or the like.

The user input unit 307 can be configured to receive entered number or character information, and generate key signal input related to user settings and function control of the user device. Alternatively, the user input unit 307 includes a touch panel 3071 and another input device 3072. The touch panel 3071, also called a touch screen, may collect touch operation on or near the touch panel by users (for example, operation on the touch panel 3071 or near the touch panel 3071 by fingers or any suitable objects or accessories such as a touch pen by the users). The touch panel 3071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 310, and receives and executes a command sent by the processor 310. In addition, the touch panel 3071 may be implemented in various types such as a resistor, a capacitor, an infrared ray, or a surface acoustic wave. The user input unit 307 may further include another input device 3072 in addition to the touch panel 3071. Alternatively, the another input device 3072 may include but is not limited to a physical keyboard, a functional button (such as a volume control button or a power on/off button), a trackball, a mouse, and a joystick. Details are not described herein.

Further, the touch panel 3071 may cover the display panel 3061. When detecting the touch operation on or near the touch panel 3071, the touch panel 3071 transmits the touch operation to the processor 310 to determine a type of a touch event, and then the processor 310 provides corresponding visual output on the display panel 3061 based on the type of the touch event. In FIG. 4, the touch panel 3071 and the display panel 3061 as two separate parts implement input and output functions of the user device. However, in some embodiments, the touch panel 3071 and the display panel 3061 can be integrated to implement the input and output functions of the user device, which is not specifically defined herein.

The interface unit 308 is an interface for connecting an external apparatus with the user device 300. For example, the external apparatus may include a wired or wireless headphone port, an external power supply (or a battery charger) port, a wired or wireless data port, a storage card port, a port used to connect to an apparatus having an identification module, an audio input/output (I/O) port, a video I/O port, an earphone port, and the like. The interface unit 308 may be configured to receive input (for example, data information and power) from an external apparatus and transmit the received input to one or more elements in the user device 300 or may be configured to transmit data between the user device 300 and an external apparatus.

The memory 309 may be configured to store a software program and various data. The memory 309 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 309 may include a high-speed random access memory, and may further include a nonvolatile memory, for example, at least one magnetic disk storage device, a flash storage device, or another volatile solid-state storage device.

The processor 310 is a control center of the user device, connecting all parts of the user device using various interfaces and circuits. By running or executing software programs and/or modules stored in the memory 309 and by calling data stored in the memory 309, the processor 310 implements various functions of the user device and processes data, thus performing overall monitoring on the user device. The processor 310 may include one or more processing units. Preferably, an application processor and a modem processor may be integrated into the processor 310. The application processor mainly processes an operating system, a user interface, an application, and the like. The modem processor mainly processes wireless communications. It can be understood that, alternatively, the modem processor may not be integrated into the processor 310.

The user device 300 may further include the power supply 311 (such as a battery) that supplies power to each component. Preferably, the power supply 311 may be logically connected to the processor 310 by using a power management system, to implement functions such as charging, discharging, and power consumption management by using the power management system.

In addition, the user device 300 includes some function modules, which are not shown and will not be described in detail herein.

An embodiment of the present disclosure further provides a user device, including a processor, a memory, and a program stored in the memory and capable of running on the processor. When the program is executed by the processor, the processes of the embodiments of the foregoing service processing method can be implemented, with the same technical effects achieved. To avoid repetition, details are not described herein again.

An embodiment of the present disclosure further provides a computer-readable storage medium, where the computer-readable storage medium stores a computer program, and when the computer program is executed by a processor, the processes of the embodiments of the foregoing service processing method may be implemented, with the same technical effects achieved. To avoid repetition, details are not described herein again. The computer-readable storage medium may be a read-only memory (ROM), a random access memory (RAM), a magnetic disk, a compact disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element.

It may be clearly understood by a person skilled in the art that, for convenience and brevity of description, for a specific working process of the foregoing described system, apparatus, and unit, reference may be made to a corresponding process in the foregoing method embodiments, and details are not described herein again.

In the embodiments provided in this application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each of the units may exist alone physically, or two or more units are integrated into one unit.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

A person of ordinary skill in the art may understand that all or some of the processes in the foregoing method embodiments may be implemented by using a computer program to control related hardware. The program may be stored in a computer readable storage medium. When the program is executed, the processes in the foregoing method embodiments may be performed. The foregoing storage medium may include: a magnetic disk, an optical disc, a read-only memory (ROM), a random access memory (RAM), or the like.

It can be understood that the embodiments described in the present disclosure may be implemented by hardware, software, firmware, middleware, microcode, or a combination thereof. For implementation with hardware, the module, unit, or subunit may be implemented in one or more application specific integrated circuits (ASIC), digital signal processors (DSP), digital signal processing devices (DSPD), programmable logic devices (PLD), field-programmable gate arrays (FPGA), general purpose processors, controllers, microcontrollers, microprocessors, and other electronic units for performing the functions described in the present disclosure, or a combination thereof.

For implementation with software, technologies described in the embodiments of the present disclosure may be implemented by executing functional modules (for example, a process and a function) in the embodiments of the present disclosure. A software code may be stored in the memory and executed by the processor. The memory may be implemented in the processor or outside the processor.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A service processing method performed by a user device, wherein the user device comprises a first subscriber identity module and a second subscriber identity module, the first subscriber identity module is associated with a first subscriber identity, the second subscriber identity module is associated with a second subscriber identity, and the method comprises:

accessing a mobile network based on the first subscriber identity;

performing a wireless local area network voice over wireless fidelity (VoWiFi) service of the second subscriber identity based on a network port corresponding to the mobile network, wherein the performing a wireless local area network VoWiFi service of the second subscriber identity based on a network port corresponding to the mobile network comprises:

in a case that a preset condition is met, sending a VoWiFi registration message of the second subscriber identity to a network-side device based on the network port corresponding to the mobile network, wherein the preset condition comprises at least one of the following:

that a mobile network signal parameter of the second subscriber identity is smaller than a first preset value; or that a mobile network signal parameter of the first subscriber identity is greater than a second preset value;

wherein the method further comprises:

performing, in a case that the mobile network signal parameter of the second subscriber identity is greater than a third preset value, and the mobile network signal parameter of the first subscriber identity is smaller than a fourth preset value, VoWiFi deregistration of the second subscriber identity based on the network port corresponding to the mobile network;

the third preset value being greater than the first preset value and the fourth preset value being smaller than the second preset value.

2. The method according to claim 1, wherein the performing a wireless local area network VoWiFi service of the second subscriber identity based on a network port corresponding to the mobile network comprises:

in a case that a voice over long-term evolution (VoLTE) call is performed based on the first subscriber identity, when a trigger signal of a dual subscriber identity module (SIM) and dual active service for the user device is received, performing the VoWiFi call based on the network port corresponding to the mobile network and the second subscriber identity.

3. A user device, wherein the user device comprises a first subscriber identity module and a second subscriber identity module, the first subscriber identity module is associated with a first subscriber identity, the second subscriber identity module is associated with a second subscriber identity, and the user device comprising:

a processor; and a memory storing a program that is capable of running on the processor, wherein the program, when executed by the processor, causes the user device to perform the following steps:

accessing a mobile network based on the first subscriber identity;

performing a wireless local area network voice over wireless fidelity (VoWiFi) service of the second subscriber identity based on a network port corresponding to the mobile network, wherein the performing a wireless local area network VoWiFi service of the second subscriber identity based on a network port corresponding to the mobile network comprises:

in a case that a preset condition is met, sending a VoWiFi registration message of the second subscriber identity to a network-side device based on the network port corresponding to the mobile network, wherein the preset condition comprises at least one of the following:

that a mobile network signal parameter of the second subscriber identity is smaller than a first preset value; or that a mobile network signal parameter of the first subscriber identity is greater than a second preset value;

wherein the program, when executed by the processor, causes the user device to further:

perform, in a case that the mobile network signal parameter of the second subscriber identity is greater than a third preset value, and the mobile network signal parameter of the first subscriber identity is smaller than a fourth preset value, VoWiFi deregistration of the second subscriber identity based on the network port corresponding to the mobile network;

the third preset value being greater than the first preset value and the fourth preset value being smaller than the second preset value.

4. The user device according to claim 3, wherein the performing a wireless local area network VoWiFi service of the second subscriber identity based on a network port corresponding to the mobile network comprises:

in a case that a voice over long-term evolution (VoLTE) call is performed based on the first subscriber identity, when a trigger signal of a dual subscriber identity module (SIM) and dual active service for the user device is received, performing the VoWiFi call based on the network port corresponding to the mobile network and the second subscriber identity.

5. A non-transitory computer-readable storage medium storing a computer program, wherein the computer program, when executed by a processor, performs the followings steps:

accessing a mobile network based on a first subscriber identity;

performing a wireless local area network voice over wireless fidelity (VoWiFi) service of a second subscriber identity based on a network port corresponding to the mobile network, wherein the performing a wireless local area network VoWiFi service of the second subscriber identity based on a network port corresponding to the mobile network comprises:

in a case that a preset condition is met, sending a VoWiFi registration message of the second subscriber identity to a network-side device based on the network port corresponding to the mobile network, wherein the preset condition comprises at least one of the following:

that a mobile network signal parameter of the second subscriber identity is smaller than a first preset value; or that a mobile network signal parameter of the first subscriber identity is greater than a second preset value;

wherein the computer program, when executed by a processor, further performs a step of:

performing, in a case that the mobile network signal parameter of the second subscriber identity is greater than a third preset value, and the mobile network signal parameter of the first subscriber identity is smaller than a fourth preset value, VoWiFi deregistration of the second subscriber identity based on the network port corresponding to the mobile network;

the third preset value being greater than the first preset value and the fourth preset value being smaller than the second preset value.

6. The non-transitory computer-readable storage medium according to claim 5, wherein the performing a wireless local area network VoWiFi service of the second subscriber identity based on a network port corresponding to the mobile network comprises:

in a case that a voice over long-term evolution (VoLTE) call is performed based on the first subscriber identity, when a trigger signal of a dual subscriber identity module (SIM) and dual active service for the user device is received, performing the VoWiFi call based on the network port corresponding to the mobile network and the second subscriber identity.

* * * * *